United States Patent [19]

Janssen

[11] 4,167,058
[45] Sep. 11, 1979

[54] CONVEYOR AND SHOE LIFTING ASSEMBLY FOR TRACTOR TRACKS

[75] Inventor: Harvey W. Janssen, Lafayette, Calif.

[73] Assignee: Wolff Manufacturing Company, Burlingame, Calif.

[21] Appl. No.: 847,134

[22] Filed: Oct. 31, 1977

[51] Int. Cl.² .............................................. B23K 1/14
[52] U.S. Cl. .................................... 29/822; 198/339; 198/489
[58] Field of Search .......................... 29/822, 823, 824; 198/485, 489, 339; 83/415, 418; 214/DIG. 10; 254/10 R, 10 C

[56] References Cited

U.S. PATENT DOCUMENTS

| | | | |
|---|---|---|---|
| 2,603,338 | 7/1952 | Fried | 198/485 |
| 2,756,963 | 7/1956 | Rogers, Sr. | 254/10 C |
| 2,922,533 | 1/1960 | Barge, Jr. | 254/10 C X |
| 3,075,346 | 1/1963 | Quaive et al. | 59/7 |
| 3,126,938 | 3/1964 | McCoy | 198/339 X |
| 3,339,706 | 9/1967 | Arvidson | 198/485 X |
| 3,705,679 | 12/1972 | Tenpas | 29/822 X |

*Primary Examiner*—Leon Gilden
*Attorney, Agent, or Firm*—Flehr, Hohbach, Test, Albritton and Herbert

[57] ABSTRACT

A conveyor and shoe lifting assembly for tractor tracks of the type having a chain and a plurality of ground engaging shoes or grousers. The shoe lifting assembly includes a pair of spaced rails which are moved from a first position to a second position to engage and lift the shoes off of the chain during disassembly of the track links. Thereafter, the rails are moved from the second position to the first position to replace the shoes after reassembly of the track links.

5 Claims, 6 Drawing Figures

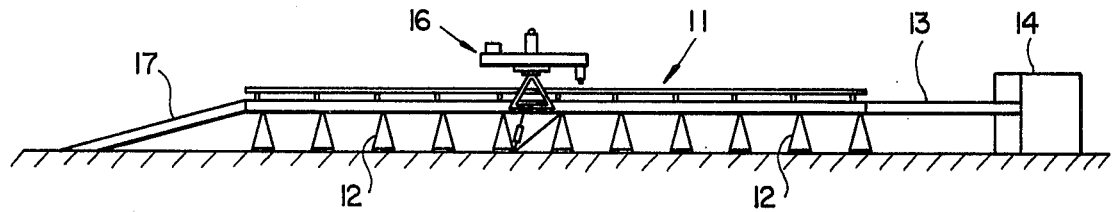
FIG_1
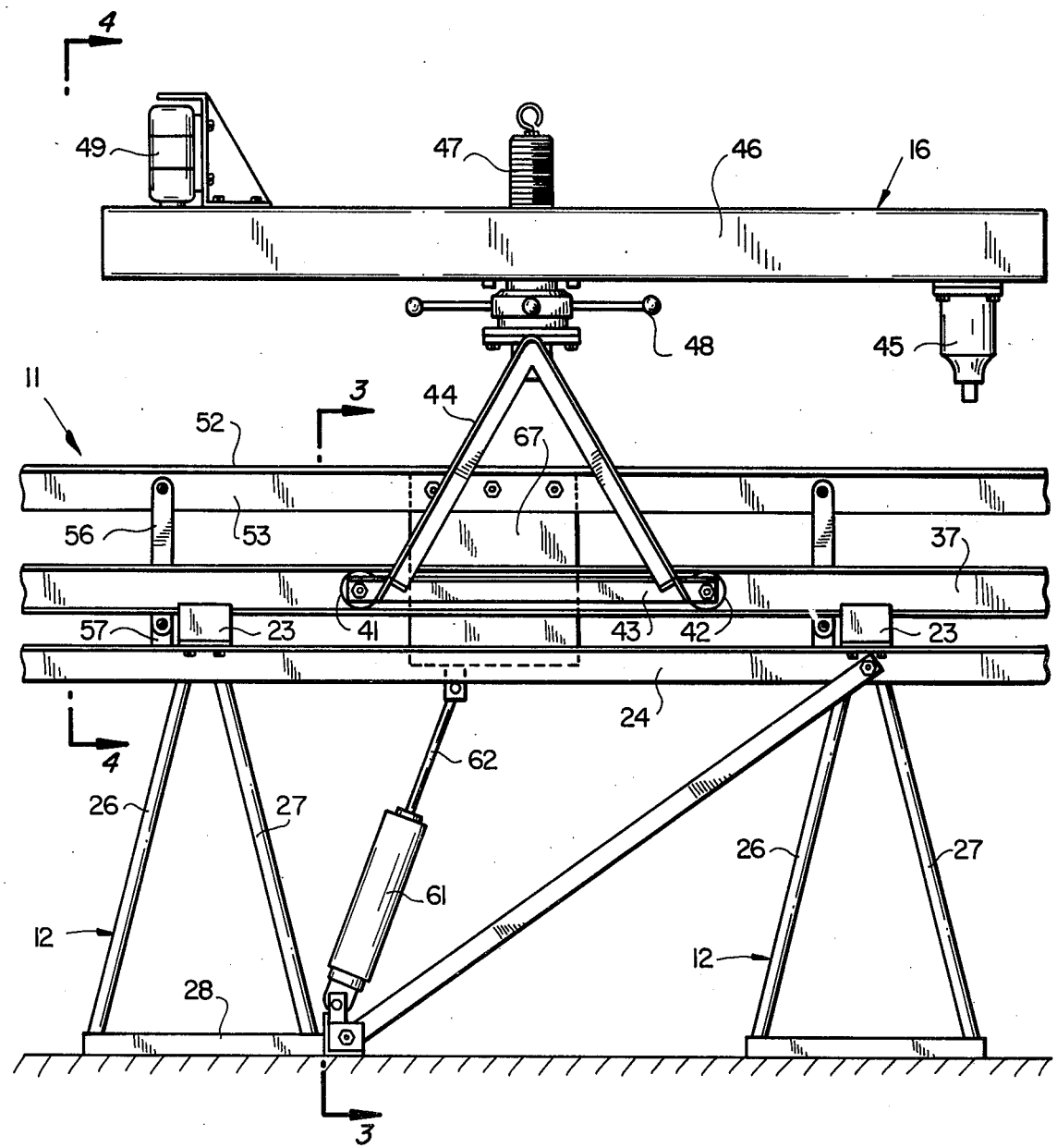
FIG_2

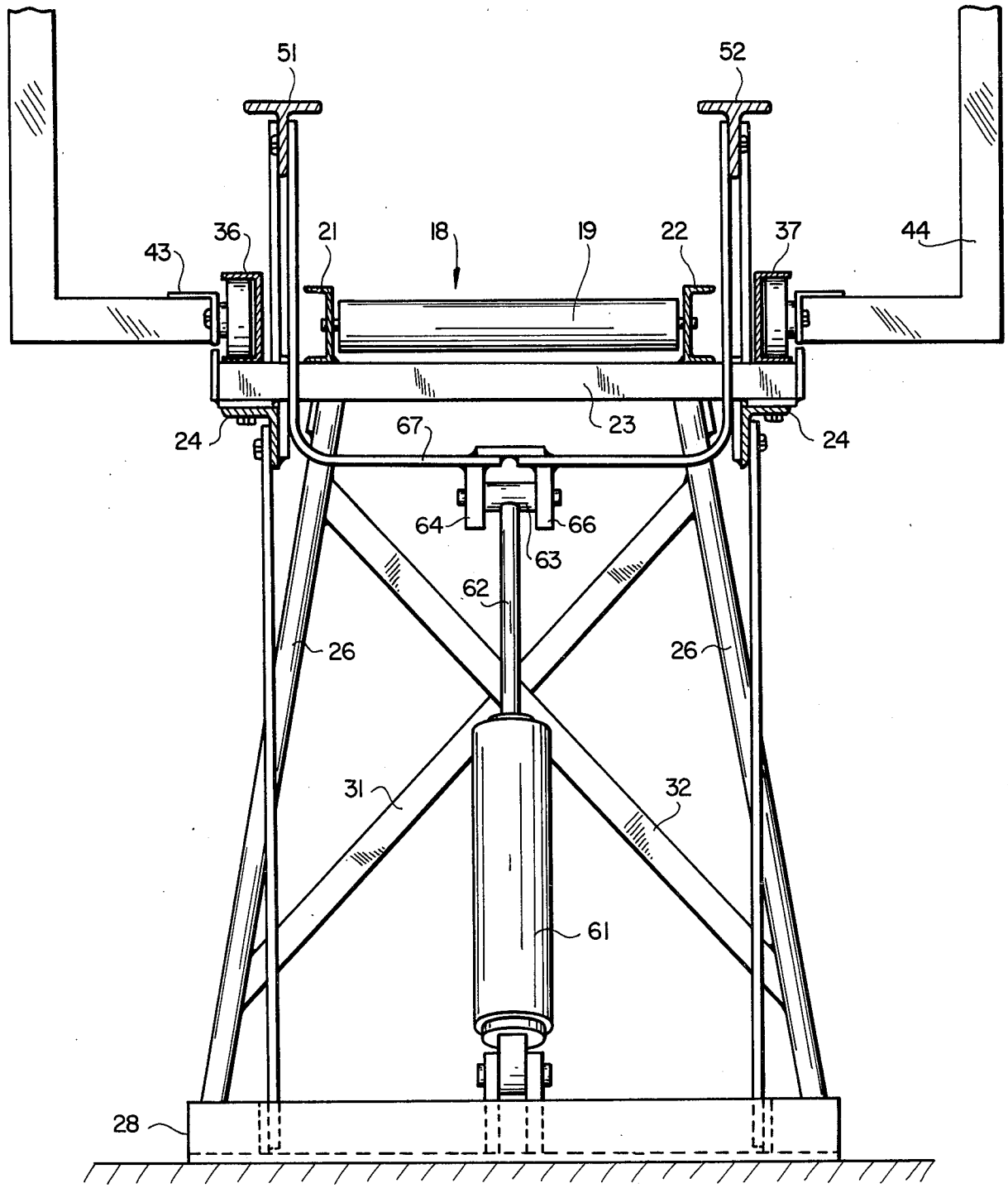
FIG_3

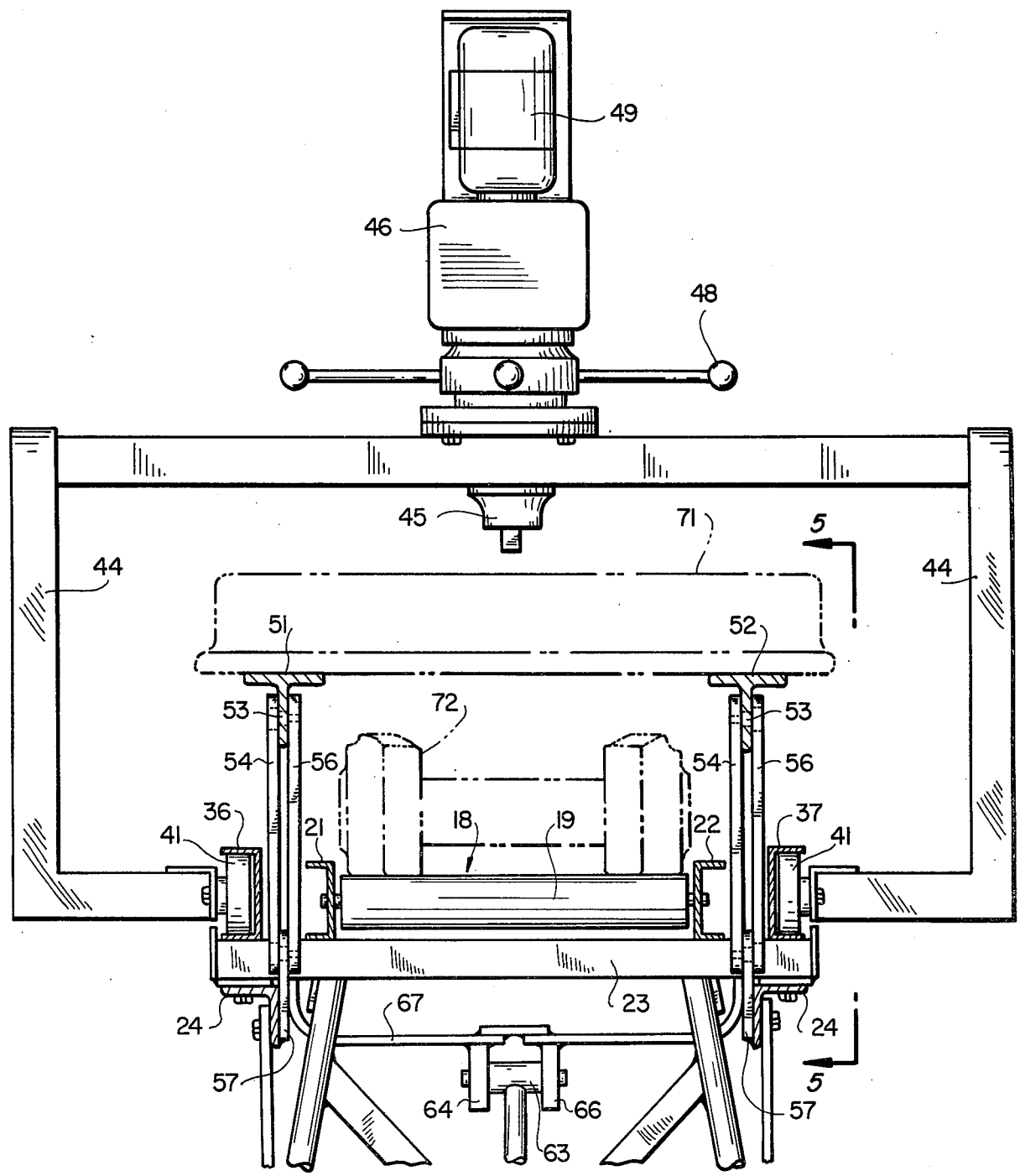
FIG_4

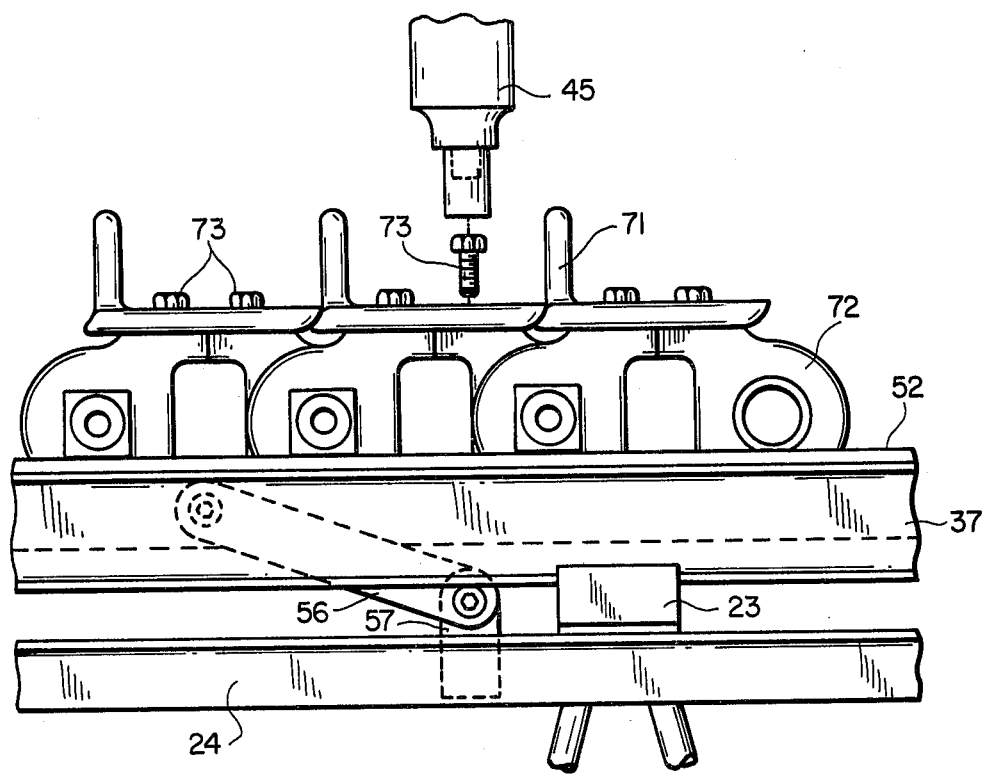
FIG_5a
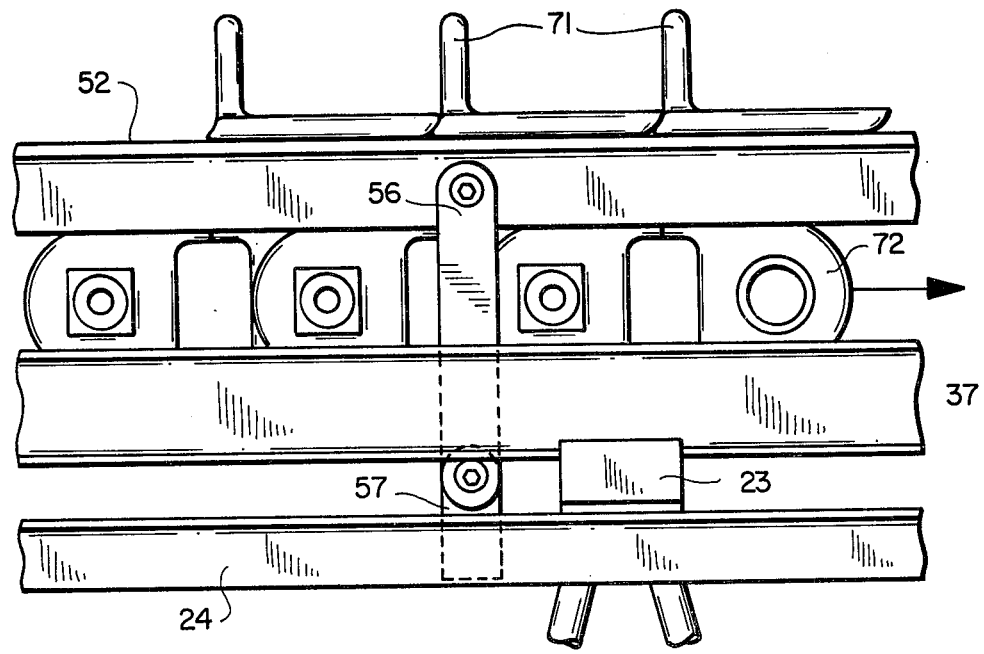
FIG_5b

CONVEYOR AND SHOE LIFTING ASSEMBLY FOR TRACTOR TRACKS

BACKGROUND OF THE INVENTION

This invention relates generally to a conveyor and shoe lifting assembly for tractor tracks of the type having a chain with a plurality of ground engaging shoes.

Crawler or track lying tractors are widely used particularly for heavy duty work. The tracks employed in such tractors include ground engaging shoes or grousers removably secured to a drive chain driven over an idler sprocket by means of a driven sprocket. The drive chain includes a plurality of sections, each adapted to receive a shoe. Each section includes a pair of side links spaced apart to receive the sprocket wheel teeth. Each section is pivotally joined to the next adjacent section by means of a cross pin and bushing. The side links of each section are relatively widely spaced at one end to receive the relatively closely spaced ends of the next side link. Bushings are press fit into the closely spaced ends, while pins are press fit into the widely spaced ends of each pair to form a pivotal joint between sections.

Because of the nature and operation of tractors, the tracks are subjected to rapid wear and require frequent repair. Generally, for repair, the track is removed from the tractor by removal of a master pin and the track is laid out. The chain is then moved onto a conveyor and then moved to present the links in sequence to a track press which may be of the type described in U.S. Pat. No. 3,075,346. Hydraulic rams move space pins and bushing tools mounted on a tool bar into cooperative relationship with the pins and bushing to remove the pins and bushings from the links to release the side links for disassembly. During reassembly, the chain is moved in the opposite direction and pins and bushings are inserted.

When operating on larger tracks, the grousers or shoes are removed from the chain prior to presentation of the chain to the track press. The shoes or grousers are removed by removing the bolts which secure the shoes to the links of the chain. A power operated wrench of the type described in U.S. Pat. No. 3,108,507 can be employed for the purpose of removing the bolts during disassembly and for applying the bolts during reassembly of the track. In smaller tracks, the operator can during disassembly manually lift the shoes of the chain and place them on the ground adjacent the associated conveyor and lift the shoes and place them on the chain during re-assembly after the pins and bushings have been removed and replaced.

As tractors and tracks have increased in size, it has been necessary to employ power mechanisms of various types to individually remove and replace the shoes during disassembly and assembly operations. The apparatus presently employed is not designed for the purpose and is expensive and inefficient.

OBJECTS AND SUMMARY OF THE INVENTION

It is a general object of the present invention to provide a conveyor and shoe lifting assembly for tractor tracks.

It is another object of the present invention to provide a conveyor and shoe lifting assembly including space rails which engage and lift and lower the shoes during disassembly and reassembly of a tractor track.

It is another object of the present invention to provide a conveyor, shoe lifting, and wrench assembly for disassembly and reassembly of tractor track shoes.

It is a further object of the present invention to provide a conveyor and shoe lifting and lowering device which is simple in construction and usable in connection with conventional track conveyors.

The foregoing and other objects of the invention are achieved by a conveyor and shoe lifting assembly for tractor tracks of the type having a chain with a plurality of ground engaging shos including an elongated conveyor assembly for receiving and supporting the track so that it can be moved therealong, support means for supporting the conveyor assembly, and shoe lifting and lowering rails disposed on each side of said conveyor assembly and supported by said supporting means, said shoe lifting and lowering assembly being located to engage the shoes of said tractor track and lift the shoes when the rails are moved from a first position to a second position during disassembly and to lower the shoes when the rails are moved from the second position to the first position during reassembly, and means for moving said rails between the first and second positions.

BRIEF DESCRIPTION OF THE DRAWINGS

FIG. 1 is a side elevational view showing a conveyor and shoe lifting assembly in accordance with the invention associated with a power conveyor and track press.

FIG. 2 is an enlarged view of the conveyor and shoe lifting assembly and associated power operated wrench.

FIG. 3 is an elevational view taken generally along the line 3—3 of FIG. 2.

FIG. 4 is a sectional view taken generally along the line 4—4 of FIG. 2.

FIG. 5A shows the shoes and rail prior to being moved from the first to the second position.

FIG. 5B shows the shoes and rails in the second lifted position.

DESCRIPTION OF THE PREFERRED EMBODIMENT

Referring to FIG. 1, there is shown a conveyor and shoe lifting section 11 in accordance with the present invention and to be presently described in detail. The section 11 is supported by a plurality of spaced support stands 12. The section cooperates with a power conveyor 13 which conveys the chain to a track press 14. The track press may be of the type described in U.S. Pat. No. 3,075,346. A power operated wrench 16 is associated with the section 11 and may be of the type described in U.S. Pat. No. 3,108,507. In operation, a track is drawn along the inclined conveyor 17 onto the conveyor and shoe lifting section 11 where the shoes or grousers are detached from the chain and lifted. The chain is then moved into the track press 14 by the power conveyor 13 and the chain is disassembled by removing the pins and bushings. Thereafter, the chain is re-assembled by replacing the pins and bushings and moved by the power conveyor 13 onto the shoe lifting and conveyor section 11 where the shoes are lowered and replaced on the chain. The track is then removed from the assembly along the inclined conveyor 17.

Referring to FIGS. 2, 3 and 4, the conveyor 18 includes rollers 19 rotatably mounted between rails 21 and 22. The conveyor 18 is supported on spaced cross members 23 mounted upon spaced longitudinal angles 24 and upon the stands 12. The stands 12 include pairs of legs 26 and 27 which are inclined inwardly as shown in FIG. 3. The lower ends of the spaced legs 26 and 27 are secured to base 28. The stand is stabilized by cross members 31 and 32 secured to the spaced legs 26 and 27 of each support member 12.

A pair of longitudinal spaced channel rails 36 and 37 are supported by the cross members 23 and receive the spaced rollers 41 and 42 of the power wrench assembly 16. The rollers 41 and 42 are mounted at the ends of a longitudinal member 43 and a V-shaped support structure 44 extends upwardly therefrom and serves to support the power wrench. The power wrench includes an arm 46 rotatably secured on a screw 47 so that it can be adjusted in elevation by means of the threaded member 48. The arm serves to support the power means 49 at one end and the wrench 45 at its other end. The arm is pivotally secured between the V-shaped supports so that the wrench can be lowered to engage an associated bolt such as schematically illustrated in FIG. 5A. The complete wrench assembly can be moved along the length of the conveyor and lifting section 11 by rolling the wrench along the spaced channels 36 and 37.

In accordance with the present invention, there is provided a pair of spaced T-shaped rails 51 and 52 which are located outside of the conveyor 18 and which, when lifted, are adapted to engage the ends of an associated track shoe or grouser. The rails 51 and 52 have their downwardly extending leg 53 engaged by a pair of links 54, 56 which have their other end pivotally secured to a support 57. The support 57 is suitably welded or otherwise attached to the longitudinal angle rails 24 previously described.

Thus, by pivotal movement of the links, the T rails 51 and 52 may be lifted into the position shown in FIGS. 2, 3 and 4 or may be lowered to the position of FIG. 5. In the lowered position the outside edge of the T-shaped members 51 and 52 rest upon the top of the spaced channels 36 and 37, respectively.

Suitable means for lifting and lowering the rails is provided and may comprise a hydraulic cylinder 61 having one end secured to the base 28 and a piston 62 secured to cross member 63 disposed between spaced plates 64 and 66. The plates 64 and 66 are secured to a U-shaped member 67 which extends upwardly and is bolted or riveted to the spaced T rails 51 and 52. Thus, when the hydraulic cylinder is actuated, it will move the U-shaped member 67 upwardly to pivot the links and allow the T rail to be lifted upwardly as shown. When the cylinder is energized in the opposite direction, it will lower the T rails downwardly until the edge is supported by the channels 36 and 37.

Referring specifically to FIG. 5A, the T rails are in their lowered or first position. The grousers or shoes 71 are being detached from the associated links by removing the securing bolts 73. As soon as all of the bolts 73 have been removed, the cylinder 61 is energized to rotate the link clockwise and lift the rails 51 and 52 upwardly to engage the ends of the shoes and lift the shoes from the links as shown in FIG. 5B. During reassembly operation, the cylinder is operated to rotate the links counter-clockwise. The shoes are lowered into position above the links 72 and the bolts 73 and reinserted.

Thus, it is seen that the conveyor and shoe lifting assembly is simple in construction and provides for lifting all of the shoes in a track section at one time and holding the shoes in position as the chain is moved into the track press, the pins and bushings removed, and replaced when the chain is reassembled and moved back into position under the shoes, then are lowered and reattached to the chain.

The shoe lifting assembly is easy to operate and eliminates the tedious task of removing and replacing the shoes one at a time.

I claim:

1. A conveyor and shoe lifting assembly for tractor tracks of the type having a chain with a plurality of ground engaging shoes secured thereto comprising: an elongated conveyor assembly for receiving and supporting said tractor track so that it can be moved therealong, support means for supporting said conveyor assembly, a shoe lifting rail disposed on each side of said conveyor assembly and supported by said supporting means, said shoe lifting rails being located to engage the ends of the shoes of said track when the rails are moved from a first non-engaging position to a second engaging and lifting position and for lowering the shoes into the chain when moved from the second to the first position, means for moving the rails between the first and second position, an additional pair of rails supported on said support means and a power operated wrench supported by said rails for movement along said conveyor.

2. A conveyor and shoe lifting assembly as in claim 1 in which said means for moving the rails comprises a hydraulic actuator.

3. A conveyor and shoe lifting assembly for tractor tracks of the type having a chain with a plurality of ground engaging shoes secured thereto comprising: an elongated conveyor assembly for receiving and supporting said tractor track so that it can be moved along a predetermined path defined by said conveyor assembly, support means for supporting said conveyor assembly, and means including a shoe lifting rail disposed on each side of said conveyor assembly and supported by said supporting means, said shoe lifting rails being located to engage the ends of the shoes of said track when the rails are moved from a first non-engaging position to a second engaging and lifting position and for lowering the shoes onto the chain when moved from the second to the first position, said last named means also including means for moving the rails between the first and second position and a power operated wrench located above said conveyor assembly directly over said path for movement along the latter.

4. A conveyor and shoe lifting assembly for tractor tracks of the type having a longitudinal chain with a plurality of spaced ground engaging shoes disengagably secured thereto, comprising: an elongated conveyor assembly extending along a predetermined path for receiving and supporting said tractor track so that the latter can be moved along said path, support means for supporting said conveyor assembly, means for disengaging said shoes from said chain and for securing said two back together while said chain is on said conveyor assembly, an elongated shoe lifting rail disposed on each side and parallel with said conveyor assembly along said path and supported by said supporting means, said shoe lifting rails being of sufficient length and specifically located to engage the ends of all of the shoes of said track when the rails are moved from a first non-engaging position to a second engaging and lifting position for lifting said shoes simultaneously to said second position after said shoes are disengaged from said chain and for lowering the shoes onto the chain when moved from the second to the first position, and means for moving the rails between the first and second position, whereby said track can be moved onto said assembly when said rails are in said first position for disengaging and thereafter simultaneously lifting said shoes away from said chain and, with said rails and shoes in said second position, said chain can be moved onto and off of said assembly.

5. An assembly as in claim 4 wherein said shoe disengaging and securing means includes a power operated wrench and means for supporting the latter above and along said conveyor assembly.

* * * * *